(12) United States Patent
Andrei et al.

(10) Patent No.: US 9,268,810 B2
(45) Date of Patent: Feb. 23, 2016

(54) LOCKING ACROSS MULTIPLE RID SPACES

(71) Applicants: Mihnea Andrei, Issy les Moulineaux (FR); Anil Goel, Waterloo (CA); Colin Florendo, Marlborough, MA (US); Rolando Blanco, Waterloo (CA); David DeHaan, Waterloo (CA)

(72) Inventors: Mihnea Andrei, Issy les Moulineaux (FR); Anil Goel, Waterloo (CA); Colin Florendo, Marlborough, MA (US); Rolando Blanco, Waterloo (CA); David DeHaan, Waterloo (CA)

(73) Assignee: Sybase, Inc., Dublin, CA (US)

( * ) Notice: Subject to any disclaimer, the term of this patent is extended or adjusted under 35 U.S.C. 154(b) by 235 days.

(21) Appl. No.: 14/143,864

(22) Filed: Dec. 30, 2013

(65) Prior Publication Data

US 2015/0186444 A1    Jul. 2, 2015

(51) Int. Cl.
*G06F 17/30* (2006.01)
*G06F 11/14* (2006.01)

(52) U.S. Cl.
CPC ...... *G06F 17/30362* (2013.01); *G06F 11/1448* (2013.01); *G06F 17/30309* (2013.01); *G06F 17/30368* (2013.01); *G06F 17/30371* (2013.01); *G06F 2201/80* (2013.01); *G06F 2201/825* (2013.01); *G06F 2201/84* (2013.01); *G06F 2201/87* (2013.01)

(58) Field of Classification Search
None
See application file for complete search history.

(56) References Cited

U.S. PATENT DOCUMENTS

| | | | |
|---|---|---|---|
| 5,280,612 A | 1/1994 | Lorie et al. | |
| 5,870,758 A | 2/1999 | Bamford et al. | |
| 6,618,719 B1 | 9/2003 | Andrei | |
| 7,822,727 B1 | 10/2010 | Shaughnessy | |
| 8,356,007 B2 | 1/2013 | Larson et al. | |
| 8,504,542 B2 | 8/2013 | Chang et al. | |
| 8,601,038 B2 | 12/2013 | Plattner et al. | |
| 8,631,000 B2 | 1/2014 | Franke et al. | |
| 2005/0033720 A1* | 2/2005 | Verma | G06F 9/466 |
| 2009/0070330 A1 | 3/2009 | Hwang et al. | |
| 2009/0271412 A1* | 10/2009 | Lacapra | G06F 17/30206 |
| 2012/0151495 A1 | 6/2012 | Burckhardt et al. | |
| 2012/0221528 A1 | 8/2012 | Renkes et al. | |
| 2013/0318058 A1 | 11/2013 | Fries et al. | |
| 2013/0339312 A1 | 12/2013 | Schreter | |
| 2014/0025651 A1 | 1/2014 | Schreter | |
| 2014/0095335 A1* | 4/2014 | Grosz | G06F 3/0484 |
| | | | 705/26.1 |

FOREIGN PATENT DOCUMENTS

EP    2660734 A1    6/2013

* cited by examiner

*Primary Examiner* — Wilson Lee
(74) *Attorney, Agent, or Firm* — Sterne, Kessler, Goldstein & Fox P.L.L.C.

(57) ABSTRACT

A locking mechanism in a delta-store-based database to support long running transactions across multiple RID spaces is described. An example method includes establishing a column-based in-memory database including a main store and a delta store. A delete or an update statement is executed with a transaction on a table having plurality of table versions. The table versions are represented by bitmaps in the delta store and the bitmaps and table fragments corresponding to the table versions implement RID spaces for the table. A lock on a row of the table manipulated by the delete or the update statement is requested to preclude other transaction from deleting or updating an obsolete version of data. Upon a successful validation that the row to be locked is not the obsolete version in the RID spaces of the table, a lock is granted to the transaction.

21 Claims, 8 Drawing Sheets

LOCKING ACROSS MULTIPLE RID SPACES

CROSS-REFERENCE TO RELATED APPLICATION

This application is related to Non-Provisional application Ser. No. 13/960,335, filed Aug. 6, 2013, entitled "DELTA STORE GIVING ROW-LEVEL VERSIONING SEMANTICS TO A NON-ROW-LEVEL VERSIONING UNDERLYING STORE," which is incorporated by reference herein in its entirety.

BACKGROUND

With the development in modern computer architectures, fast communication among multi-core processors makes parallel processing possible. Because large main memory configurations become commercially available and affordable, server setups with hundreds of cores and several terabytes of main memory may also be a reality.

High performance database systems, such as in-memory databases, are adaptive to make full use of the main memory provided by modern hardware. In such systems, all relevant data may be kept in main memory, so that read operations can be executed without disk I/O. The systems are designed to minimize the number of CPU cache misses and avoid CPU stalls because of memory access. One approach for achieving this goal is using column-based storage in memory, which leads to high spatial locality of data and instructions, so the operations can be executed completely in the CPU cache without costly random memory accesses.

In a column-based storage, the entries of a column are stored in contiguous memory locations. Columnar data storage allows highly efficient compression, such that the relevant data can be stored in main memory with less cost because of data compression. The data structure that contains the main part of the data is called the main storage. The changes are taken over from the delta storage asynchronously at some later point in time. The separation into main and delta storage allows high compression and high write performance at the same time. The column store may implement MVCC (Multi Version Concurrent Control), which is based on having multiple versions of the same data in the database. When reading data it ensures that the operation reads the right set of versions required to get a correct and consistent view of the database. A Consistent View Manager may determine which version each operation is allowed to see depending on the current transaction isolation level.

The column store may use a delta storage—an in-memory data store that implements row-level versioning that is optimized to support real time data ingestion—to provide a high level of transaction concurrency through MVCC. In order to support these design objectives, a high performance locking mechanism is required to provide row level locking capabilities, especially for long running transactions across various table versions in multiple Row Id (RID) spaces. However, the current state of the art for managing locks requires excessive resources in acquiring and releasing locks. Therefore, current system fails to provide an ideal row-level mechanism with optimal performance and scalability.

BRIEF DESCRIPTION OF THE DRAWINGS/FIGURES

Embodiments are described, by way of example only, with reference to the accompanying drawings. In the drawings, like reference numbers generally indicate identical or functionally similar elements. The drawing in which an element first appears is typically indicated by the leftmost digit or digits in the corresponding reference number.

DETAILED DESCRIPTION

Provided herein are system, method and/or computer program product embodiments, and/or combinations and subcombinations thereof, for providing multiple RID spaces locking in a delta-store-based database to support long running transactions. As will be described in further detail below, embodiments can implement a main store, a delta store, and bitmaps covering the RID range of both main and delta stores. The bitmaps represent table versions visible to a transaction at the different point of time, and the bitmaps and corresponding table fragments thus constitute various RID spaces for the table. Embodiment can further traverse RID spaces of the table during the course of a long running transaction to determine if a row to be locked by the transaction is obsolete.

System

Figure 1:
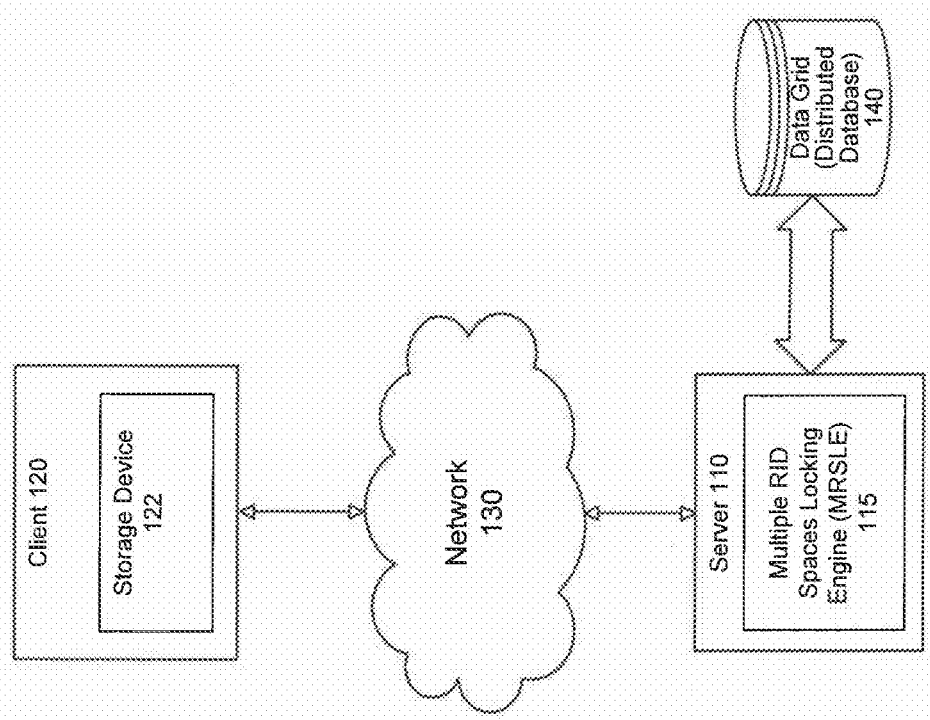
FIG. 1 illustrates a client/server system, according to an embodiment.

FIG. 1 illustrates a client/server system 100. System 100 includes a server 110, a Multiple RID Spaces Locking Engine (MRSLE) 115, a client 120, a network 130, and a database 140.

Client 120 communicates with server 110 over the network 130. Specifically, client 120 may be connected to a Database Management System (DBMS) (not shown) on server 110 via network 130. In an embodiment, the DBMS includes Sybase® IQ (available from Sybase, Inc. of Dublin, Calif.) and operates as an independent process (i.e., independently of the clients), running under a server operating system such as Microsoft® Windows NT, Windows 2000, Windows XP, Windows Vista and Windows 7 (all from Microsoft Corporation of Redmond, Wash.), UNIX (Novell), Solaris (Sun), or Linux (Red Hat). The network 220 includes functionality for packaging client calls in the well-known Structured Query Language (SQL) together with any parameter information into a format (of one or more packets) suitable for transmission to the DBMS. Client 120 may send SQL statement to server 110 and receive query result from server 110. Although only one server 110 is shown, more servers may be used as necessary. Network 130 may be any network or combination of wired and wireless networks that carry data communication. Such network can include, but is not limited to, a local area network, medium area network, and/or wide area network such as the Internet.

Client 120 includes a storage device 122. Although only one client 120 is shown, more clients may be used as necessary. Storage device 122, an example of which will be described in detail with respect to FIG. 8, can be any device for recording and storing information, which includes but is not limited to, flash memory, magnetic tape and optical discs.

Server 110 can host MRSLE 115. As illustrated in FIG. 1, client 120 can send data requests to server 110, which can in turn invoke MRSLE 115 for further processing. MRSLE 115 can be software, firmware, or hardware or any combination thereof in a computing device. System 100 can be implemented on or implemented by one or more computing devices. As will be further described with respect to FIG. 8, a computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s).

Figure 2:
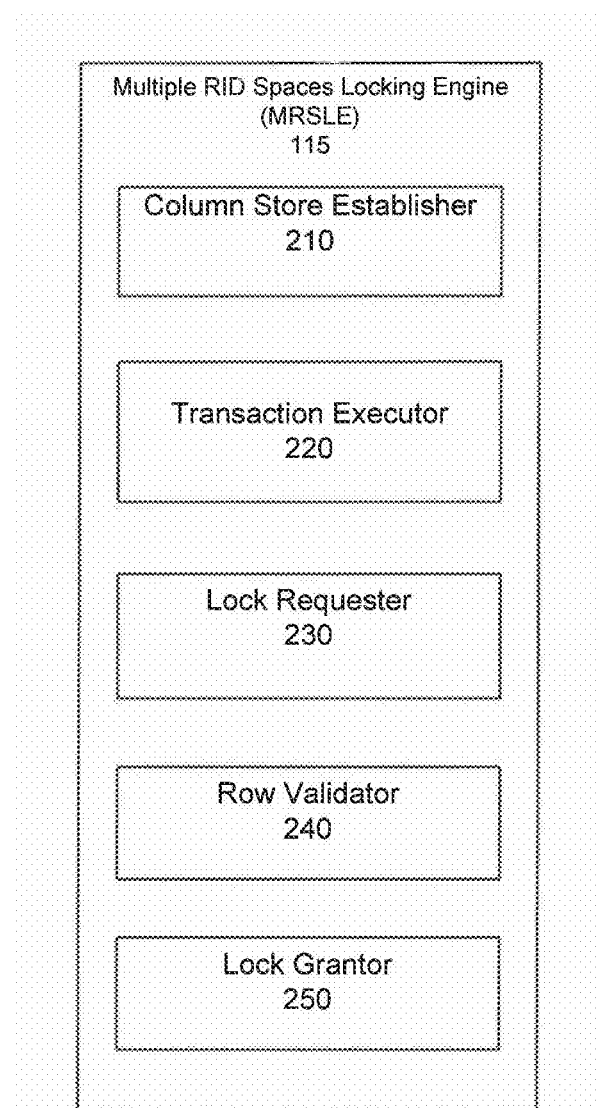
FIG. 2 illustrates elements of a Multiple RID Spaces Locking Engine (MRSLE), according to an embodiment.

FIG. 2 illustrates elements of a Multiple RID Spaces Locking Engine (MRSLE), according to an embodiment. In the example shown in FIG. 2, MRSLE 115 includes column store establisher 210, transaction executor 220, lock requester 230, row validator 240, and lock grantor 250.

Column store establisher 210 establishes a column-based in-memory database including a main store and a delta store, where the main store does not allow concurrent transactions on a same table. In an embodiment, the delta store has a plurality of row-visibility bitmaps implementing a row-level versioning mechanism that allows concurrent transactions on the same table.

Transaction executor 220 executes within a transaction, a delete or an update statement on a table having plurality of table versions. In an embodiment, the table versions provide transaction-consistent snapshots of the table visible to the transaction at various points in time. In another embodiment, the table versions are represented by bitmaps in the delta store and the bitmaps corresponding to the table versions implement RID spaces for the table.

Lock requester 230 requests a lock on a row of the table manipulated by the delete or the update statement to preclude other transaction from deleting or updating an obsolete version of data.

Row validator 240 validates the row so that the row to be locked is not the obsolete version in the RID spaces of the table.

Lock grantor 250 grants a lock to the transaction upon a successful validation of the row.

Optionally, MRSLE 115 may further include additional components as described below.

According to an embodiment, MRSLE 115 further includes a clause qualifier that qualifies with a WHERE clause of the delete or update statement a set of rows to be deleted or updated. For the transaction executing the delete or update statement and as a consequence of the delete or update statement, a current version of the row in each of the qualified rows becomes obsolete immediately after the delete or update statement. In another embodiment, for a new transaction starts after a commit of the transaction executing the delete or update statement, and as a consequence of the delete or update statement, a current version of the row in each of the qualified rows becomes obsolete at the commit of the transaction executing the delete or update statement.

In an embodiment, MRSLE 115 further includes a RID space traverser that traverses all RID spaces, starting with a RID space of the transaction which executes the delete or the update statement, up to a most recent RID space. Each merge that occurs during a course of the transaction may generate a more recent RID space.

In an embodiment, MRSLE 115 further includes a RID identifier that identifies the corresponding RID for the row in each of the traversed RID spaces using RID mapping information generated by the merge.

In an embodiment, MRSLE 115 further includes a row determiner that determines the row as obsolete if the row is marked as deleted in a delete map in each of the traversed RID spaces.

In an embodiment, MRSLE 115 further includes a transaction aborter that releases the lock and aborts the transaction if the row is obsolete.

In an embodiment, the lock is requested on corresponding RID of the row in the most recent RID space.

In an embodiment, MRSLE 115 further includes a transaction sleeper that sets the transaction to sleep if the lock on the row was already acquired and not yet released by the other transaction.

In an embodiment, MRSLE 115 further includes the lock grantor that grants the lock if no other transaction holds a lock on the same row;

In an embodiment, MRSLE 115 further includes the row determiner that determines the row as obsolete if it is marked as deleted in the delete bitmap of the latest version in the most recent RID space, when the lock is acquired.

In an embodiment, the delete or update statement is executed only if the lock is acquired and the row is validated as current.

In an embodiment, MRSLE 115 further includes a lock releaser that releases the lock on the row upon a commit or rollback of the transaction which has acquired the lock.

Embodiments of the elements of MRSLE 115 in FIG. 2, as described herein, may be further configured to run in parallel. Such parallel execution of these elements would increase the efficiency and speed of MRSLE 115.

Method

Figure 3:
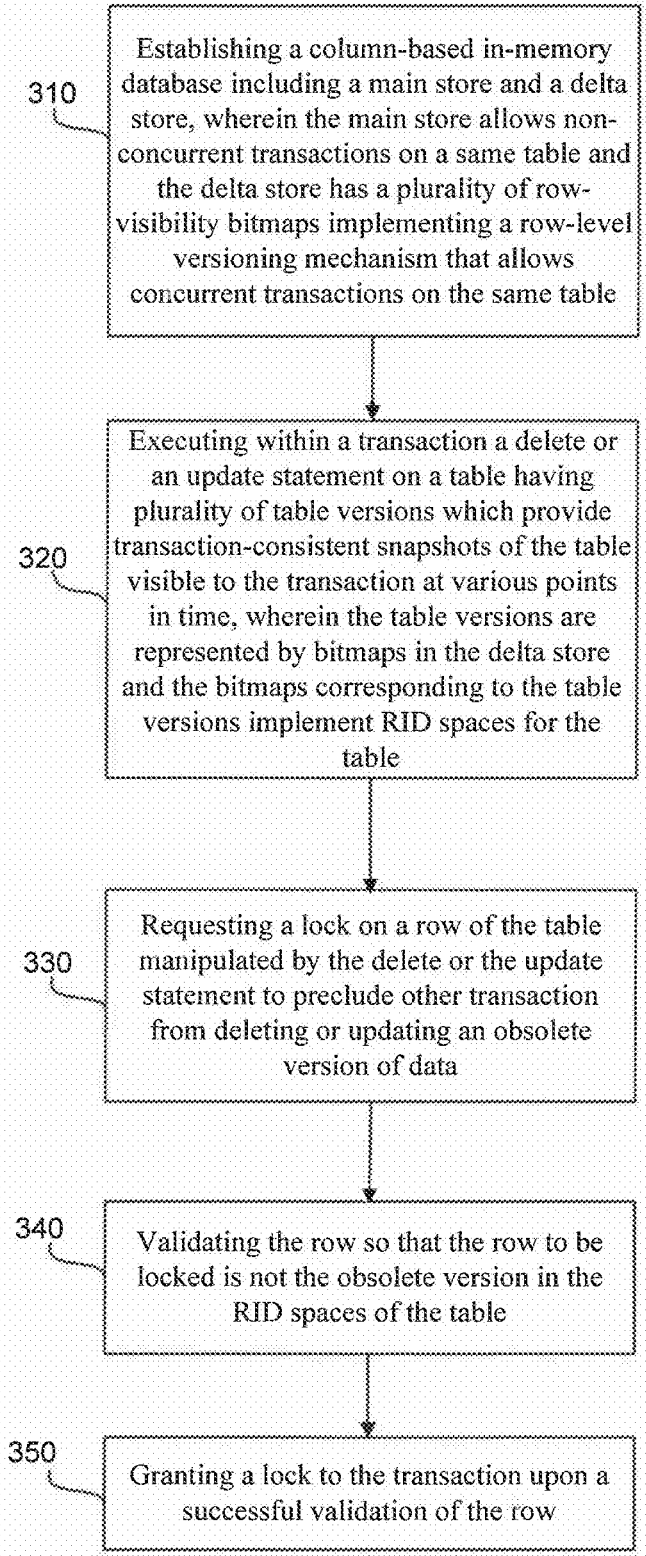
FIG. 3 is a flowchart for a method for a locking mechanism for long running transactions across multiple RID spaces, according to an embodiment.

FIG. 3 is a flowchart for a method for a locking mechanism for long running transactions across multiple RID spaces, according to an embodiment. For ease of explanation, method 300 will be described with respect to MRSLE 115 of FIG. 2, which is in server 110, as described above. However, method 300 is not intended to be limited thereto.

At stage 310, a column-based in-memory database including a main store and a delta store is established. In an embodiment, the main store does not allow concurrent transactions on a same table and the delta store has a plurality of row-visibility bitmaps implementing a row-level versioning mechanism that allows concurrent transactions on the same table. For example, column store establisher 210 may establish the main store and the delta store.

At stage 320, a delete or an update statement is executed within a transaction on a table. In an embodiment, the table has a plurality of table versions which provide transaction-consistent snapshots of the table visible to the transaction at various points in time. In another embodiment, the table versions are represented by bitmaps in the delta store and the bitmaps corresponding to the table versions implement RID spaces for the table. For example, transaction executor 220 executes a delete or an update statement within a transaction on a table.

At stage 330, a lock on a row of the table manipulated by the delete or the update statement is requested to preclude other transaction from deleting or updating an obsolete version of data. For example, row locker 230 requests a lock on a row of the table manipulated by the delete or update statement.

At stage 340, the row is validated so that the row to be locked is not the obsolete version in the RID spaces of the table. For example, row validator 240 validates the row so that the row to be locked is not the obsolete version.

In an embodiment, a WHERE clause of the delete or update statement is qualified with a set of rows to be deleted or updated. For the transaction executing the delete or update statement, as a consequence of the delete or update statement, a current version of the row in each of the qualified rows becomes obsolete immediately after the delete or update statement. In another embodiment, for a new transaction that starts after a commit of the transaction executing the delete or update statement, as a consequence of the delete or update statement, a current version of the row in each of the qualified rows becomes obsolete at the commit of the transaction executing the delete or update statement.

In an embodiment, all RID spaces are traversed, starting with a RID space of the transaction which executes the delete or the update statement, up to a most recent RID space, where each merge that occurs during a course of the transaction generates a more recent RID space.

At stage 350, a lock is granted to the transaction upon a successful validation of the row. For example, lock grantor 250 grants the lock to the transaction upon a successful validation of the row.

The details of stages 310-50 for a locking mechanism to support long running transactions across multiple RID spaces will be further illustrated in FIGS. 4-7 below.

According to an embodiment, locking may not be necessary in snapshot isolation, because when a row is deleted in the main store, the delete bitmap corresponding to main store of the table version has an entry set to 1, for example, on row Rx, indicating row Rx is deleted in the latest RID space. Accordingly, row Rx is deleted in all subsequent RID spaces. From the perspective of locking, snapshot isolation means there is no blocker, because a reader sees the data in different versions determined at the point in time that the transaction begins. Due to the consistency in the database isolation, and the transaction sees the rows as the version that transaction starts, there is no need to lock on the level of transaction and sleep and wait on the lock. Thus, there is no need to read a piece of data that is to be protected, because the older version of the data is available.

In an embodiment, for a SQL delete statement in a current transaction, the WHERE clause qualifies the rows to be deleted, through a read operation. Likewise, the RIDs corresponding to the rows to be deleted can be identified. However, the rows identified by the read operation in the snapshot visible to the current may be an older version that either becomes obsolete or no longer exists. Further, a newer version may be created for the same set of rows. Because snapshot isolation does not block on the read side, the obsolete versions can be handled gracefully on the read side.

In contrast, the obsolete versions may be problematic on the writer side for the delete statement. For example, a row qualified via the read operation cannot be deleted without verifying whether it is the current version. In another example, if some other transaction has deleted a row, the current transaction may not delete the same row the second time.

In an embodiment, a SQL update statement can be considered as a delete statement followed by an insert statement. Similarly, a transaction may not be allowed to delete an old version of the row, because the same row may be updated by other transactions. Thus, when a transaction attempts to update a row by deleting it first, then inserting a new version, there is a risk that an older version of the row may be deleted.

In an embodiment, a row may be deleted if it corresponds to the latest version, because it is not logical to delete the same row twice and the deletion may be part of the update. For databases that implementing snapshot isolation, a transaction sees a row as it is in the version visible to the transaction as it starts. But the transaction may only update the row if the row corresponds to the latest version.

In an embodiment, the obsolete version may not impact the insert operations because an insert operation only inserts a new version—either an insert of the first version of the row or an insert side of the update—which is certainly the newest version. However, for a delete operation, or a delete side of an update operation, a row cannot be deleted without checking if the row is still active. Accordingly, transaction locks at the delete time need to be implemented.

FIGS. 4-7 below elaborate on the representation of the lock structure in the multiple RID spaces. As noted above, the rows need to be locked for the delete operations. However, it may not be sufficient to lock on RIDs of the corresponding rows, because the RID for the same row may change in different RID spaces, if a merge occurs during the course of the transaction. For example, while a transaction deletes a row, but it is not committed yet, a merge occurs. Since the deletion of the row is not committed, the row is still visible in the next version of main store. Then the merge completes, and an issue may arise if a new transaction also attempts to delete the same row in the main store. Given that the transaction spans two table-level versions in two RID spaces, RIDs for the same rows may change in different RID spaces, and conflicting locks may exist.

Notably, from the perspective of application clients, the merge is not visible. Although the RID moves from the old table-level version to the new table-level version, the merge activity of the rows from the delta store to the main store is not visible to the applications. Accordingly, mapping of RIDs from RID space to RID space needs to handle the mutual exclusion aspect of the deletes across RID spaces.

Figure 4:
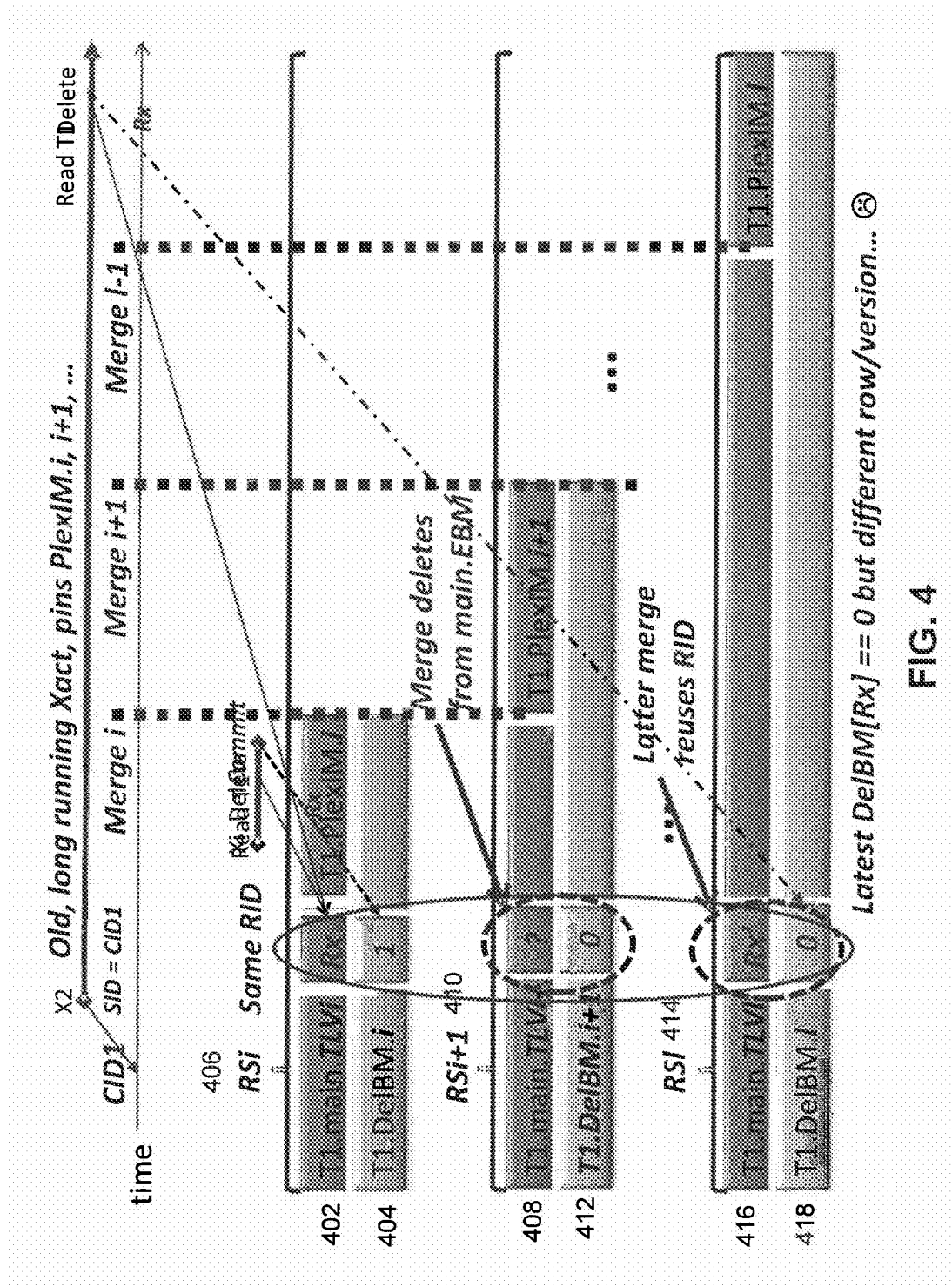
FIG. 4 depicts the reuse of RIDs for a long running transaction, according to an embodiment.

FIG. 4 depicts the reuse of RIDs for a long running transaction, according to an embodiment. In the example illustrated in FIG. 4, before the occurrence of merges i, i+1 . . . 1–1, transaction x1 deletes row Rx in main store T1.main.TLVi 402 and commits in RID space RSi 406. Long transaction x2 also starts in RID space RSi 406. As indicated by delete bitmap T1.DelBM.i 404, row Rx has an entry "1" and the row is thus marked as deleted in the main store T1.main.TLVi 402 in RID space RSi 406. Merge i creates RID space RSi+1 410 and effectively deletes row Rx from main store T1.main.TLVi+1 408.

In an embodiment, a merge deletes the row from the bitmap of main store, where the deletion is marked in the delete bitmap visible to the transaction x1. In the next version after the merge, main store may mark the row as deleted. For example, in RID space RSi+1, as indicated in main store T1.main.TLVi+1 408, there is no corresponding value in the RID where Rx originally was. In delete bitmap T1.DelBM.i+1 412, the row is not marked as deleted, because row Rx does not exist in the main store T1.main.TLVi+1 408 in RID space RSi+1. Thus, FIG. 4 shows the deletion of row Rx among RID spaces.

As the long running transaction x2 proceeds, upon the occurrence of another merge 1–1, a new row Rx' is inserted into main store T1.main.TLV1 416, with the same RID that row Rx previously references. After the merge 1–1 which generates RID space RSl 414, long running transaction x2 attempts to delete row Rx'. Because a RID may be reused between RID spaces RSi 406 and RSl 414, and transactions x1 and x2 attempt to delete two rows with the same RID, the conflict may not be avoided by simply putting a lock on this RID. Indeed, the layout of the main store may be changed in the cross merge of main store with the delta store.

Figure 5:
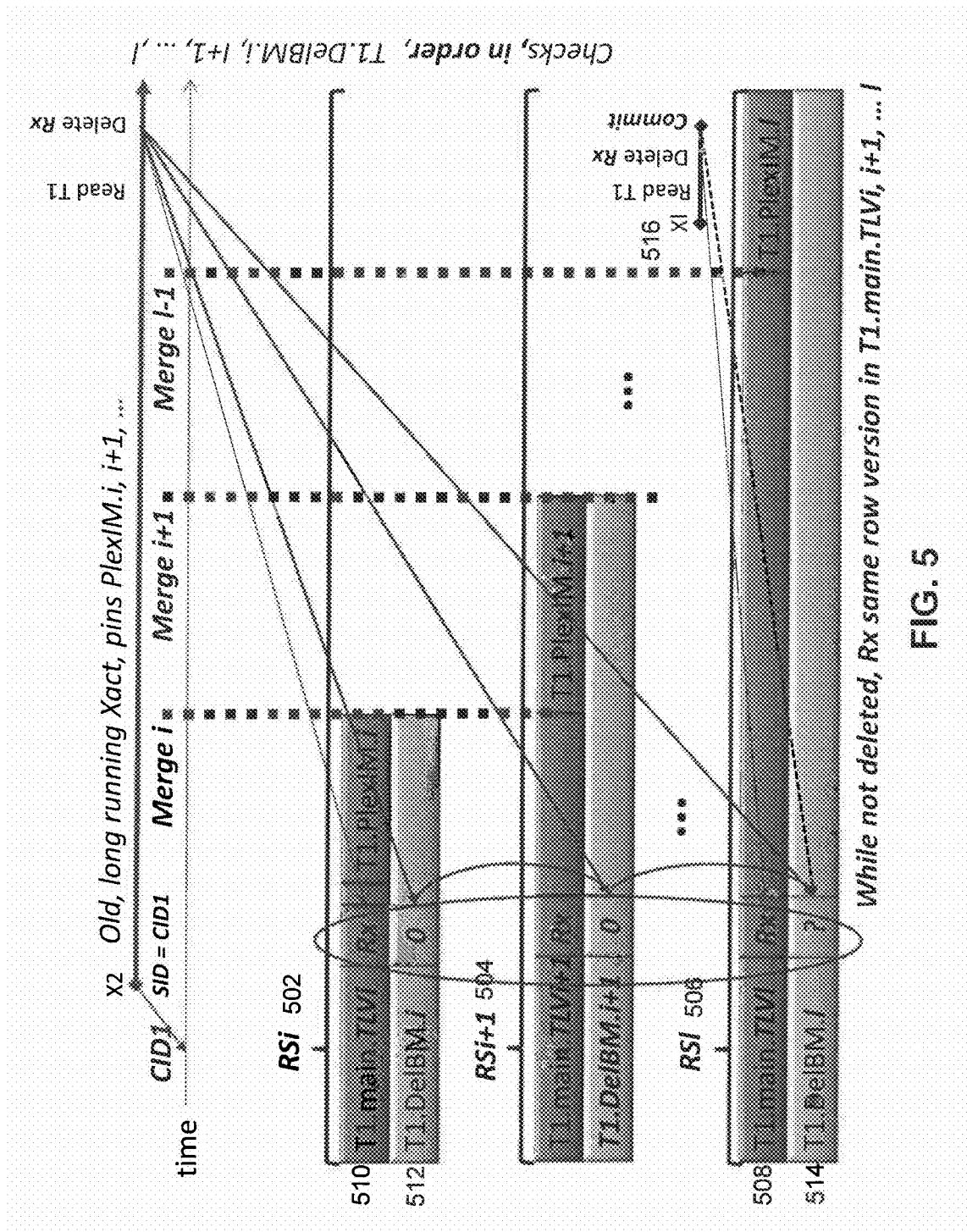
FIG. 5 depicts a locking mechanism for a long running transaction across multiple RID spaces, according to an embodiment.
Figure 6:
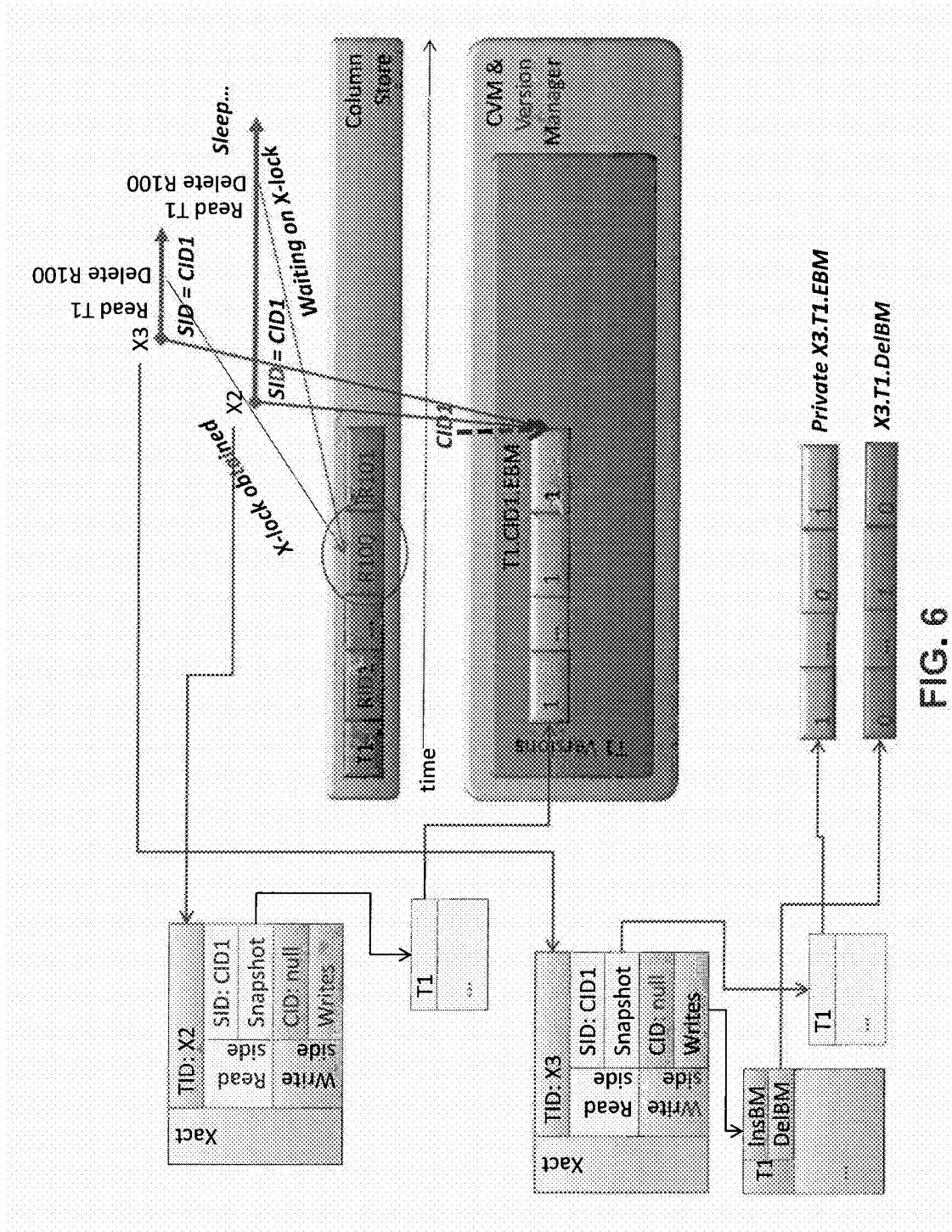
FIG. 6 depicts a locking mechanism for concurrent transactions with conflicting deletes blocks, according to an embodiment.
Figure 7:
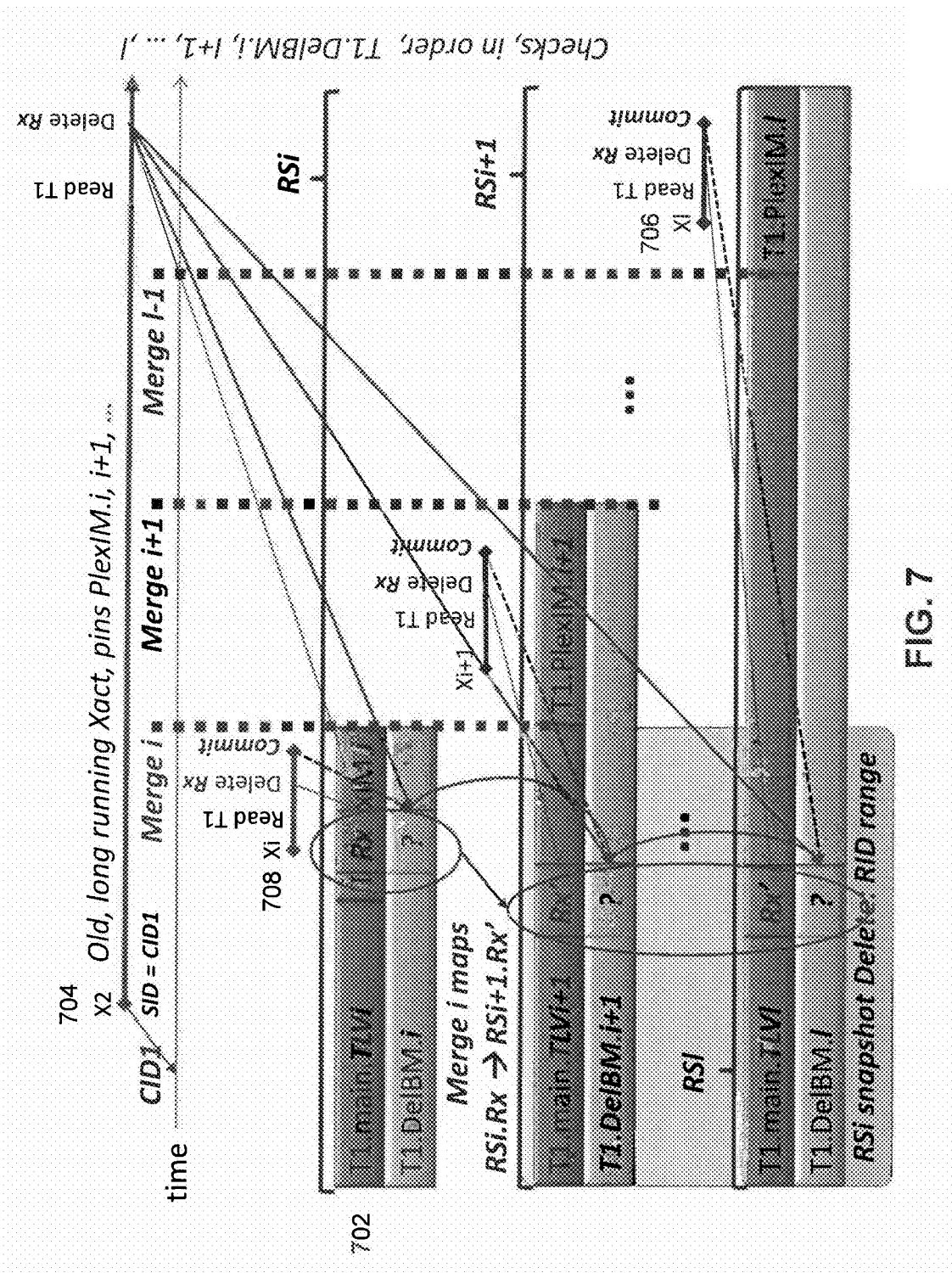
FIG. 7 depicts a locking mechanism for a transaction across multiple RID spaces, according to an embodiment.

FIGS. 5-7 illustrates using multiple RID spaces to resolve the conflicts noted above and make the corresponding rows in different RID spaces to conflict when necessary.

FIG. 5 depicts a locking mechanism for a long running transaction across multiple RID spaces, according to an embodiment. According to FIG. 5, an old, long running transaction x2 pins and sees all table fragments in delta store T1.PlexIM.i, T1.PlexIM.i+1 . . . T1.PlexIM.1. In this example, transaction x2 starts in RID space RSi 502; merge i creates table space RSi+1; . . . and merge l−1 creates RSl.

In the latest RID space RSl 506, the latest main store is T1.main.TLV1 508. In the process, old long running x2 survives in RID space RSl 506 and new transaction x1 516 also starts in RID space RSl 506. Both transactions attempt to delete the same row Rx. In RID space RSi 502, row Rx exists in main store T1.main TLVi 510 and it is not deleted as indicated by bitmap T1.DelBM.i 512.

In RID space RSl 506, row Rx is also in main store T1.main.TLV1 508, visible to transaction x1, and can be deleted by transaction x1 516. Thus, a mechanism needs to be implemented so that transactions x2 and x1 acknowledge the fact that they both attempt to delete the same row Rx in main store T1.main.TLV1 508 and they may block each other.

In an embodiment, each transaction checks in the order, starting from its own RID space where the transaction starts, traverses to the next RID space that is active at the time and so on, to verify that the row was not deleted in all these RID spaces. In the situation of transaction x1 516, because it starts in RID space RSl 506, only RID space RSl 506 is checked, which immediately identifies whether row Rx is deleted. In the case of old transaction x2, which starts in its own RID space RSi 502, x2 checks that row Rx is not deleted in RID space RSi 502. It then moves to the next active RID space RSi+1 504, and checks that the row is not deleted by any other transactions in RID space RSi+1 504. X2 continues until it reaches the latest RID space RSl 506, checking if the row is deleted in the latest RID space. If row Rx is deleted in any of the RID spaces, transaction x2 may not delete the row for a second time. Otherwise, if row Rx is not deleted in any of the RID spaces, then old transaction x2 may delete the row.

In this example, transaction x1 does manage to delete row Rx and commits in RID space RSl 506. Thus, in the delete bitmap T1.DelBM.1 514, if transaction x1 does get there first, it may have a "1" in bitmap T1.DelBM.1 514, and transaction x2 may learn the deletion and fail. Based on this mechanism, multiple RID spaces can be used to handle delete operations—each transaction may start checking in its own RID space, then move from RID space to RID space, until it reaches the latest RID space. If the row is deleted in any of the RID spaces, the transaction stops the checking process immediately, because the row is not current any longer. Otherwise, the process continues and if the transaction succeeds in all of the RID spaces, it can delete the row. In an embodiment, the checking process is done at the time executing the delete statement, and traverses RID spaces.

FIG. 6 depicts a locking mechanism for concurrent transactions with conflicting deletes blocks, according to an embodiment. Upon executing a delete operation of a transaction, the deletion is marked in the private bitmap before the transaction commits. Before marking the row as deleted, the transaction need to obtain a lock. In one embodiment, a lock may be obtained based on a key, such as a RID of the row to be locked. In another embodiment, if a transaction waits on the lock, it goes to sleep. If the transaction gets the lock, it would release the lock after the transaction commits.

In the example of FIG. 6, at delete time, both transactions x2 and x3 attempt to get a lock on RID 100. In an embodiment, the locking process is independent from commit of the transactions and the merge of the main and delta stores. In another embodiment, the first transaction that gets the lock succeeds and blocks subsequent transactions. For example, transaction x3 gets the lock first, and transaction x2 sleeps. If transaction x3 commits, x2 aborts because it has no chance of success. Otherwise, if transaction x3 aborts, x2 has a second chance to take the lock, and proceed with the delete. When transaction x3 commits, it is visible on the delete bitmap X3.T1.DelBM indicating the row is deleted, and x3 releases the lock on the RID R100, because the delete is marked in the bitmap X3.T1.DelBM. If transaction x2 starts later after X3 commits, transaction x2 may not see any lock, given that transaction x3 has released the lock. However, in this case, transaction x2 directly knows in the delete bitmap X2.T1.DelBM that row Rx is not a current version.

In an embodiment, there are two aspects of the locking mechanism. First, the transaction need to check if the row is locked. This may happen if a transaction deletes the row but has not commit yet. Second, if the transaction gets the lock, the transaction needs to verify whether the row is deleted across multiple RID spaces.

FIG. 7 depicts a locking mechanism for a transaction across multiple RID spaces, according to an embodiment. As noted, both transactions x2 704 and x1 706 attempt to delete the same row Rx. Row Rx is initially in the old RID space For example, if row Rx is inserted in a PlexIM delta store in a RID space, but the delta store has not been merged, the row is deleted in the RID space.

For example, if transaction x2 704 deletes row Rx and commits in a RID space RSi, the row does not get merged. Otherwise, if row Rx is still in main store T1.main.TLVi, then it is not deleted.

In another example, if row Rx is deleted in RID space RSi+1, the row does not exist after this point. So there is no need to check in subsequent RID spaces, and the conflict is identified immediately.

In the example of FIG. 7, transaction xi 708 deletes row Rx and commits in RID space RSi. After merge i, which creates RID space RSi+1, a new row Rx' may be merged into the RID where the original Rx references. Therefore, main store needs to handle the mapping information and notify the lock manager that, row Rx in RID space RSi that transaction x2 704 is attempting to delete, actually becomes row Rx' in RID space RSi+1. Without the mapping information, transaction x2 704 does not know it has been a merge and the same RID maps to two different rows. Accordingly, the mapping information for the RIDs in the multiple RID spaces is needed to support the locking mechanism.

In an embodiment, once a row is located in the main store, the row stays in its position and the RID is fixed in the main store, until it is deleted. Likewise, if a row resides in the main store, no mapping information is needed, until that row is deleted. In another embodiment, the mapping is only needed for the subsequent RID space when a transaction is deleting a row which was previously in a delta PlexIM store and the row got merged into the main store.

As noted, for a row which is updated, it may be considered as a delete operation followed by an insertion. As a transaction traverses RID space by RID space, the row is identified in the RID space where it is deleted, a conflict may immediately arise, and the transaction may fail at this point.

In another embodiment, the merge reshuffles the rows in the delta store, but does not change the positions of the rows in the main store. In still another embodiment, in checking the RID spaces, the transaction checks the oldest RID space where the transaction starts first, and stops immediately when a failure arises.

In still another embodiment, mapping tracks the rows which are originally in PlexIM delta store and merged into main store, which are inserted in the new main store in the RID space. The mapping information may be represented using data structures familiar to an ordinary skill in the art.

In the example of FIG. 7, the mapping information may be needed as long as transaction x2 exists. In an embodiment, mapping may be represented as a virtual column in the PlexIM delta store. After the merge, the column may have an entry to record which RID in the main store corresponds to the row inserted. In still another embodiment, because the mapping is only needed for PlexIM delta store, and a RID in the main store never changes until it is deleted, so the PlexIM delta store may manage the mapping information. Accordingly, the overhead of maintaining the mapping is relatively small, as the PlexIM store is much smaller in size relative to the main store.

Example Computer System Implementation

Embodiments shown in FIGS. 1-18, or any part(s) or function(s) thereof, may be implemented using hardware, software modules, firmware, tangible computer readable media having instructions stored thereon, or a combination thereof and may be implemented in one or more computer systems or other processing systems.

Figure 8:
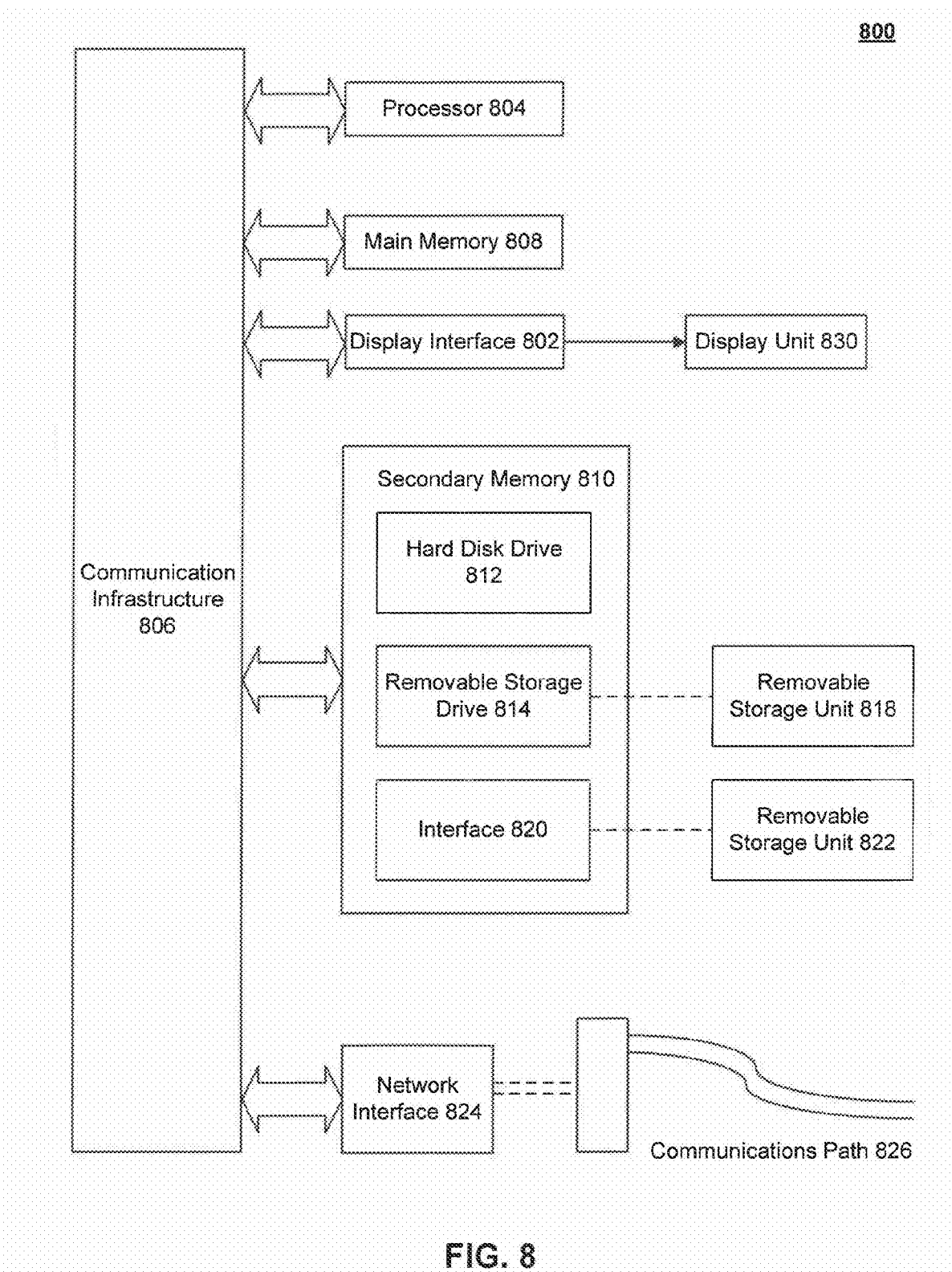
FIG. 8 is a diagram of an example computer system in which embodiments can be implemented, according to an embodiment.

FIG. 8 illustrates an example computer system 800 in which embodiments, or portions thereof, may be implemented as computer-readable code. For example, MRSLE 115, including its components, as shown in FIG. 2, can be implemented in computer system 800 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-18.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments are described in terms of this example computer system 800. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme.

Computer system 800 also includes a main memory 808, for example, random access memory (RAM), and may also include a secondary memory 810. Secondary memory 810 may include, for example, a hard disk drive 812, removable storage drive 814. Removable storage drive 814 may comprise a floppy disk drive, a magnetic tape drive, an optical disk drive, a flash memory, or the like. The removable storage drive 814 reads from and/or writes to a removable storage unit 818 in a well-known manner. Removable storage unit 818 may comprise a floppy disk, magnetic tape, optical disk, etc. which is read by and written to by removable storage drive 814. As will be appreciated by persons skilled in the relevant art, removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a network interface 824. Network interface 824 allows software and data to be transferred between computer system 800 and external devices. Network interface 824 may include a modem, a network interface (such as an Ethernet card), a communications port, a PCMCIA slot and card, or the like. Software and data transferred via network interface 824 may be in the form of signals, which may be electronic, electromagnetic, optical, or other signals capable of being received by network interface 824. These signals may be provided to network interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard disk drive 812. Computer program medium and computer usable medium may also refer to memories, such as main memory 808 and secondary memory 810, which may be memory semiconductors (e.g. DRAMs, etc.).

Computer programs (also called computer control logic) are stored in main memory 808 and/or secondary memory 810. Computer programs may also be received via network interface 824. Such computer programs, when executed, enable computer system 800 to implement embodiments as discussed herein. In particular, the computer programs, when executed, enable processor device 804 to implement the processes of embodiments of the present invention, such as the stages in the methods illustrated by flowchart 300 of FIG. 3, discussed above. Accordingly, such computer programs represent controllers of the computer system 800. Where embodiments are implemented using software, the software may be stored in a computer program product and loaded into computer system 800 using removable storage drive 814, interface 820, and hard disk drive 812, or network interface 824.

Embodiments of the invention also may be directed to computer program products comprising software stored on any computer useable medium. Such software, when executed in one or more data processing device(s), causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method for providing a locking mechanism in a database system to support transaction processing, comprising:
   establishing a column-based in-memory database including a main store and a delta store, wherein the main store allows non-concurrent transactions on a same table and the delta store has a plurality of row-visibility bitmaps implementing a row-level versioning mechanism that allows concurrent transactions on the same table;
   executing within a transaction a delete or an update statement on a table having plurality of table versions which provide transaction-consistent snapshots of the table visible to the transaction at various points in time, wherein the table versions are represented by bitmaps in the delta store and the bitmaps corresponding to the table versions implement row identifier (RID) spaces for the table;
   requesting a lock on a row of the table manipulated by the delete or the update statement to preclude other transaction from deleting or updating an obsolete version of data;
   validating the row so that the row to be locked is not the obsolete version in the RID spaces of the table; and
   granting a lock to the transaction upon a successful validation of the row.

2. The method of claim 1, further comprising:
   qualifying with a WHERE clause of the delete or update statement a set of rows to be deleted or updated, wherein for the transaction executing the delete or update statement, as a consequence of the delete or update statement, a current version of the row in each of the qualified rows becomes obsolete immediately after the delete or update statement.

3. The method of claim 1, further comprising:
   qualifying with a WHERE clause of the delete or update statement a set of rows to be deleted or updated, wherein for a new transaction, which starts after a commit of the transaction executing the delete or update statement, as a consequence of the delete or update statement, a current version of the row in each of the qualified rows becomes obsolete.

4. The method of claim 1, wherein the validating further comprises:
   traversing all RID spaces, starting with a RID space of the transaction which executes the delete or the update statement, up to a most recent RID space, in RID space creation order, wherein each merge occurring during a course of the transaction generates a more recent RID space.

5. The method of claim 4, further comprising:
   identifying corresponding RID for the row in each of the traversed RID spaces using RID mapping information generated by the merge;
   determining the row as obsolete as soon as the row is marked as deleted in a delete map of each of the traversed RID spaces; and
   releasing the lock, stopping the RID space traversal and aborting the transaction if the row is obsolete.

6. The method of claim 4, wherein the lock is requested on corresponding RID of the row in the most recent RID space.

7. The method of claim 6, further comprising:
setting the transaction to sleep if the lock on the row was already acquired and not yet released by the other transaction.

8. The method of claim 7, further comprising:
granting the lock if no other transaction holds a lock on the same row;
determining the row as obsolete if it is marked as deleted in the delete bitmap of the latest version in the most recent RID space, when the lock is acquired; and
releasing the lock, stopping the RID space transversal, and aborting the transaction if the row is obsolete.

9. The method of claim 1, wherein the delete or update statement is executed only if the lock is acquired and the row is validated as current.

10. The method of claim 1, further comprising:
releasing the lock on the row upon a commit or rollback of the transaction which has acquired the lock.

11. A system, comprising:
a memory;
at least one processor coupled to the memory;
a column store establisher that when executing in the at least one processor establishes, a column-based in-memory database including a main store and a delta store, wherein the main store allows non-concurrent transactions on a same table and the delta store has a plurality of row-visibility bitmaps implementing a row-level versioning mechanism that allows concurrent transactions on the same table;
a transaction executor that when executing in the at least one processor executes within a transaction a delete or an update statement on a table having plurality of table versions which provide transaction-consistent snapshots of the table visible to the transaction at various points in time, wherein the table versions are represented by bitmaps in the delta store and the bitmaps corresponding to the table versions implement row identifier (RID) spaces for the table;
a lock requester that when executing in the at least one processor requests a lock on a row of the table manipulated by the delete or the update statement to preclude other transaction from deleting or updating an obsolete version of data;
a row validator that when executing in the at least one processor validates the row so that the row to be locked is not the obsolete version in the RID spaces of the table; and
a lock grantor that when executing in the at least one processor grants a lock to the transaction upon a successful validation of the row.

12. The system of claim 11, further comprising:
a clause qualifier that when executing in the at least one processor qualifies with a WHERE clause of the delete or update statement a set of rows to be deleted or updated, wherein for the transaction executing the delete or update statement, as a consequence of the delete or update statement, a current version of the row in each of the qualified rows becomes obsolete immediately after the delete or update statement.

13. The system of claim 11, further comprising:
a clause qualifier that when executing in the at least one processor qualifies with a WHERE clause of the delete or update statement a set of rows to be deleted or updated, wherein for a new transaction, which starts after a commit of the transaction executing the delete or update statement, as a consequence of the delete or update statement, a current version of the row in each of the qualified rows becomes obsolete.

14. The system of claim 11, wherein the row validator further comprises:
a RID space traverser that when executing in the at least one processor traverses all RID spaces, starting with a RID space of the transaction which executes the delete or the update statement, in RID space creation order, up to a most recent RID space, wherein each merge occurring during a course of the transaction generates a more recent RID space.

15. The system of claim 14, further comprising:
a RID identifier that when executing in the at least one processor identifies a corresponding RID for the row in each of the traversed RID spaces using RID mapping information generated by the merge;
a row determiner that when executing in the at least one processor determines the row as obsolete as soon as the row is marked as deleted in a delete map in each of the traversed RID spaces; and
a transaction aborter that when executing in the at least one processor releases the lock, stops the RID space traversal and aborts the transaction if the row is obsolete.

16. The system of claim 14, wherein the lock is requested on corresponding RID of the row in the most recent RID space.

17. The system of claim 16, further comprising:
a transaction sleeper that when executing in the at least one processor sets the transaction to sleep if the lock on the row was already acquired and not yet released by the other transaction.

18. The system of claim 17, further comprising:
the lock grantor that when executing in the at least one processor grants the lock if no other transaction holds a lock on the same row;
the row determiner that when executing in the at least one processor determines the row as obsolete if it is marked as deleted in the delete bitmap of the latest version in the most recent RID space, when the lock is acquired; and
a transaction aborter that when executing in the at least one processor releases the lock, stops the RID space transversal, and aborts the transaction if the row is obsolete.

19. The system of claim 11, wherein the delete or update statement is executed only if the lock is acquired and the row is validated as current.

20. The system of claim 1, further comprising:
a lock releaser that when executing in the at least one processor releases the lock on the row upon a commit or rollback of the transaction which has acquired the lock.

21. A computer program product comprising a non-transitory computer readable storage medium having instructions encoded thereon that, when executed by a processor, cause the processor to perform operations comprising:
establishing a column-based in-memory database including a main store and a delta store, wherein the main store allows non-concurrent transactions on a same table and the delta store has a plurality of row-visibility bitmaps implementing a row-level versioning mechanism that allows concurrent transactions on the same table;
executing within a transaction a delete or an update statement on a table having plurality of table versions which provide transaction-consistent snapshots of the table visible to the transaction at various points in time, wherein the table versions are represented by bitmaps in the delta store and the bitmaps corresponding to the table versions implement row identifier (RID) spaces for the table;

requesting a lock on a row of the table manipulated by the delete or the update statement to preclude other transaction from deleting or updating an obsolete version of data;

validating the row so that the row to be locked is not the obsolete version in the RID spaces of the table; and granting a lock to the transaction upon a successful validation of the row.

* * * * *